United States Patent
Iyer et al.

(10) Patent No.: US 10,841,396 B2
(45) Date of Patent: Nov. 17, 2020

(54) METHOD AND SYSTEM FOR EDGE CACHING MEDIA CONTENT

(71) Applicant: ANI Technologies Private Limited, Karnataka (IN)

(72) Inventors: Sriram V Iyer, Karnataka (IN); Vasuki K Setlur, Karnataka (IN); Arun Samudrala, Karnataka (IN)

(73) Assignee: ANI Technologies Private Limited, Bengaluru (IN)

(*) Notice: Subject to any disclaimer, the term of this patent is extended or adjusted under 35 U.S.C. 154(b) by 109 days.

(21) Appl. No.: 15/934,671

(22) Filed: Mar. 23, 2018

(65) Prior Publication Data

US 2019/0116240 A1 Apr. 18, 2019

(30) Foreign Application Priority Data

Oct. 13, 2017 (IN) .............................. 201741036392

(51) Int. Cl.
*H04L 29/08* (2006.01)
*H04L 29/06* (2006.01)

(52) U.S. Cl.
CPC ........ *H04L 67/2857* (2013.01); *H04L 65/605* (2013.01); *H04L 65/80* (2013.01); *H04L 67/12* (2013.01)

(58) Field of Classification Search
CPC ... H04L 67/2857; H04L 67/12; H04L 65/605; H04L 65/80

USPC ........................................................ 709/213
See application file for complete search history.

(56) References Cited

U.S. PATENT DOCUMENTS

| 8,578,418 | B2 | 11/2013 | Levy et al. | |
|---|---|---|---|---|
| 8,937,903 | B2 | 1/2015 | Bari et al. | |
| 2003/0114968 | A1* | 6/2003 | Sato | G01C 21/26 701/36 |
| 2012/0011551 | A1* | 1/2012 | Levy | H04N 7/18 725/82 |
| 2014/0189753 | A1 | 7/2014 | Cugnini et al. | |
| 2016/0127334 | A1* | 5/2016 | Bangole | H04L 67/12 713/171 |
| 2016/0381419 | A1* | 12/2016 | Zhang | G06F 3/01 725/14 |

* cited by examiner

*Primary Examiner* — James E Springer
*Assistant Examiner* — Patrick F Ngankam
(74) *Attorney, Agent, or Firm* — Chip Law Group

(57) ABSTRACT

A method for edge caching media content on a first device placed in a vehicle is provided. The first device receives a first request to commute between a plurality of locations from a commuter device of a commuter. In response to the first request, the first device extracts the media content including a first set of media content and a second set of media content from a database server based on a set of rules. The extracted media content is stored in a memory. The first device controls a playback of the media content from one of the stored first set of media content or the stored second set of media content on an output device of a second device in the vehicle. The playback is controlled based on a second request by the commuter in the vehicle.

17 Claims, 5 Drawing Sheets

METHOD AND SYSTEM FOR EDGE CACHING MEDIA CONTENT

CROSS-RELATED APPLICATIONS

This application claims priority of Indian Application Serial No. 201741036392, filed Oct. 13, 2017, the contents of which are incorporated herein by reference.

FIELD OF THE INVENTION

The present invention relates generally to media content, and more particularly, to a system and a method for edge caching media content on an infotainment device in an automotive environment.

BACKGROUND

Generally, commuters utilize different modes of transportation to travel between two or more locations. For example, a commuter may prefer either a public mode of transportation or a private mode of transportation to travel between a source location and a destination location. Such traveling activities of the commuters have led to a significant increase in the demand of the different modes of the transportation. With the increase in the demand of the different modes of transportation, various transportation service providers are adopting various schemes to attract the commuters to use their services. Generally, these schemes focus on safety, efficiency, savings, and comfort level of the commuters. Some of the transportation service providers have further installed entertainment systems in their vehicles, i.e., an in-vehicle entertainment system to provide a pleasant and joyful ride experience to the passengers. Such in-vehicle entertainment systems may include a vehicle head unit, one or more inbuilt speakers, and one or more display screens for playing media content. The media content is downloaded, and stored offline in a storage device that is either embedded within or is external to the in-vehicle entertainment systems. However, since the media content available for the playback is limited due to a limited storage capacity of the storage device, overall entertainment experience of the commuters during the travel is compromised.

To encounter the limited storage capacity of the storage device, some in-vehicle entertainment systems play the media content that are received through broadcast signals in real time or near-real time. However, the broadcast signals may get affected due to poor connection over a network, which may further affect the playback of the media content. Hence, the overall entertainment experience of the commuters in the vehicle is further compromised. In such scenarios, the commuters may be required to carry various media storage devices, such as compact discs (CDs), Universal serial bus (USB) drives, flash drives, and the like, having stored media content of their interests and preferences that would be played by the in-vehicle entertainment systems. This becomes very inconvenient for the commuters.

Hence, it would be advantageous to have the in-vehicle entertainment systems for the different modes of transportation that does not require the commuters to carry any additional hardware devices, and furthermore, provides relevant media content that will enhance the experience of the commuters.

SUMMARY

In an embodiment of the present invention, a system for edge caching media content is provided. The system includes a first device placed in a vehicle. The first device includes a memory and circuitry. The memory is configured to store the media content. The circuitry is configured to receive a first request to commute between a plurality of locations. The first request is received from a commuter device of a commuter via a first communication network. The circuitry is further configured to extract the media content including a first set of media content and a second set of media content from a database server via the first communication network. The first set of media content and the second set of media content are extracted based on a set of rules in response to the received first request. The circuitry is further configured to store the extracted media content in the memory. The circuitry is further configured to control a playback of the media content from one of the stored first set of media content or the stored second set of media content on an output device of a second device in the vehicle. The playback of the media content from one of the stored first set of media content or the stored second set of media content on the display screen is controlled based on a second request by the commuter in the vehicle.

In another embodiment of the present invention, a method for edge caching media content on a first device placed in a vehicle is provided. A first request to commute between a plurality of locations is received by the first device from a commuter device of a commuter via a first communication network. In response to the received first request, the media content including a first set of media content and a second set of media content are extracted by the first device from a database server via the first communication network. The first set of media content and the second set of media content are extracted based on a set of rules. The extracted media content is stored in a memory by the first device. A playback of the media content from one of the stored first set of media content or the stored second set of media content is controlled by the first device on a display screen of a second device in the vehicle. The playback of the media content from one of the stored first set of media content or the stored second set of media content on the display screen is controlled based on a second request by the commuter in the vehicle.

Various embodiments of the present invention provide a method and a system for edge caching media content in an automotive environment. A first device placed in a vehicle receives a first request from a commuter device of a commuter via a first communication network. The first request corresponds to a request to commute between a plurality of locations. In response to the received first request, the first device extracts the media content including a first set of media content and a second set of media content from a database server. The first device is connected to the database server via the first communication network. The first set of media content and the second set of media content are extracted from the database server based on a set of rules. The first device determines the set of rules based on a fixed type and a dynamic type of the media content.

The fixed type of the media content corresponds to the first set of media content including fixed media content that is stored in the memory. The first device determines the fixed media content based on at least one of safety-related media content and trending media content. The trending media content is associated with at least one of music, movies, sports, and newscast of one or more events in one or more regions. The dynamic type of the media content corresponds to the second set of media content including dynamic media content. The first device further determines the dynamic media content based on at least one of regional preferences, commuter preferences, and watch history of the commuter. The first device further extracts the first set of media content and the second set of media content from the database server based on a segmentation of the media content in the first set of media content and the second set of media content. The first set of media content and the second set of media content are segmented based on at least one of the watch history of the commuter and a journey time between the plurality of locations. Based on the segmented media content, the first device extracts the first set of media content and the second set of media content from the database server that are significant with respect to the commuter. The first device further extracts the first set of media content and the second set of media content from the database server in a time duration that is based on a first time and a second time. The first time corresponds to a time of confirmation of the received first request by the commuter. The second time corresponds to a time of boarding of the vehicle by the commuter.

In an embodiment, based on the extracted media content from the database server, the first device stores the extracted media content in a memory of the first device. The first device further controls the playback of the media content from one of the stored first set of media content or the stored second set of media content on a display screen of a second device in the vehicle. The playback of the media content from one of the stored first set of media content or the stored second set of media content on the display screen is controlled based on a second request by the commuter in the vehicle.

In an embodiment, the second device corresponds to one of the first device, a separate device other than the first device placed in the vehicle, or the commuter device. In case the second device corresponds to one of the separate device or the commuter device, the second device is connected to the first device by means of a second communication network. Further, in an embodiment, in response to a third request by the commuter in the vehicle, the first device performs a real time extraction of the dynamic media content from the database server. The real time extraction of the dynamic media content is executed based on a remaining journey time associated with the received first request. Based on the real time extraction of the dynamic media content, the first device updates the stored second set of media content in the memory. Hence, the first device creates an edge caching of the media content that prevents the commuter to carry any additional hardware devices, and furthermore, provides relevant media content files that will enhance the overall travel experience of the commuters during the journey. Therefore, the edge caching of the media content on the first device of the vehicle provides a pleasant and joyful ride experience to the commuters.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Figure 1:
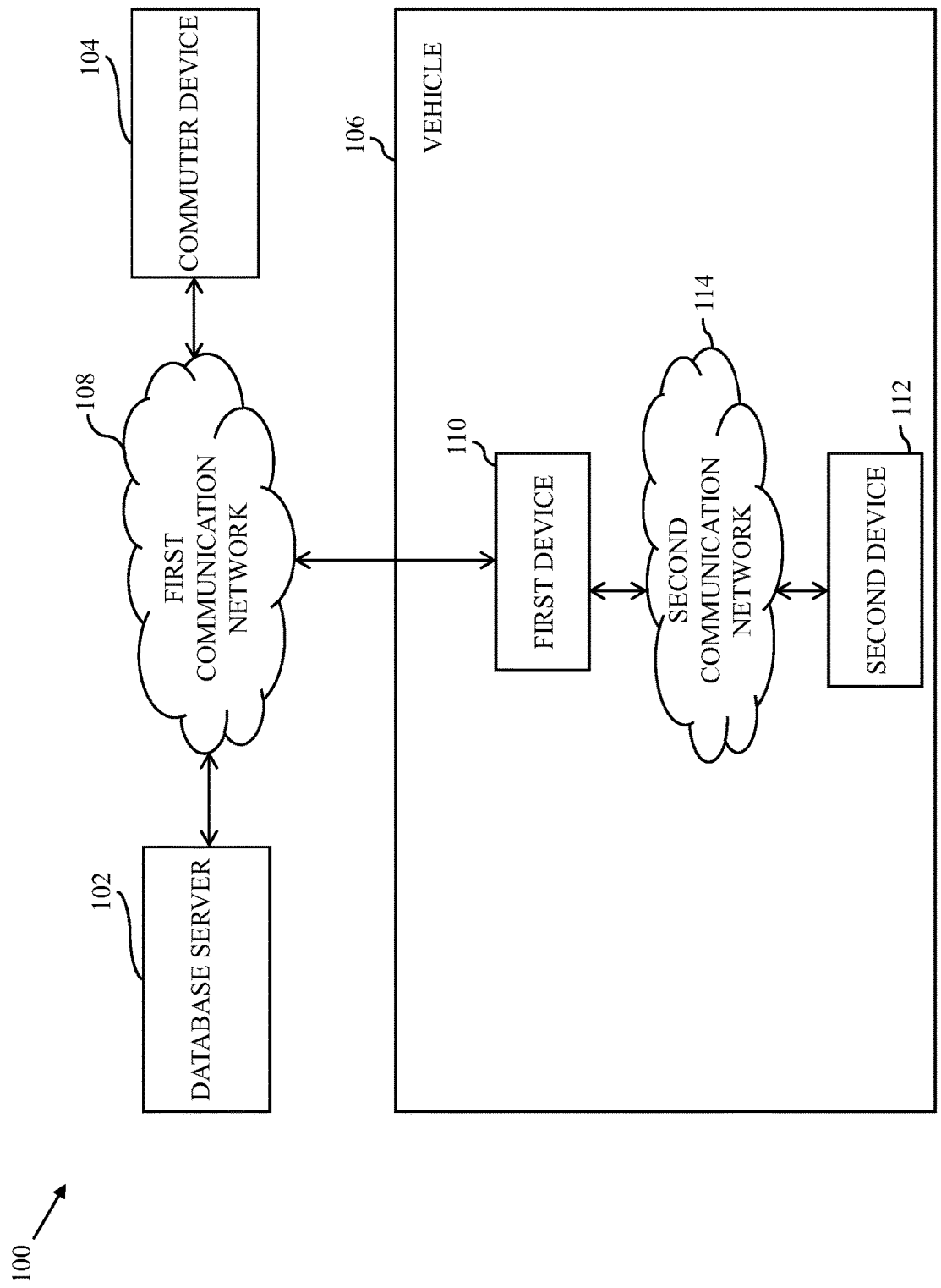
FIG. 1 is a block diagram that illustrates a system environment for edge caching media content according to an embodiment of the present invention.

Further areas of applicability of the present invention will become apparent from the detailed description provided hereinafter. It should be understood that the detailed description of exemplary embodiments are intended for illustration purposes only and are, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes a system for edge caching media content on a device of a vehicle. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Referring now to FIG. 1, a system environment 100 for edge caching media content in accordance with an embodiment of the present invention is shown. The system environment 100 includes a database server 102 and a commuter device 104. In one example, the system environment 100 is implemented in an automotive environment that includes a vehicle 106. The database server 102 transmits, in response to a query, the media content via a first communication network 108. The vehicle 106 includes a first device 110 and a second device 112. The first device 110 communicates with the second device 112 via a second communication network 114. The first device 110 further communicates with the database server 102 and the commuter device 104 via the first communication network 108.

The database server 102 is a content management server that manages entertainment content, such as the media content of various movies, television shows, songs, audio-books, newscast, and the like. The database server 102 includes a processor (not shown) and a memory (not shown). The processor of the database server 102 extracts the media content from various media content platforms based on an authentication with the content media platforms. The processor stores the extracted media content in the memory of the database server 102. The database server 102 further communicates with various devices, for example, the first device 110 placed in the vehicle 106, via the first communication network 108. For example, the database server 102 receives the query, from the first device 110 via the first communication network 108, to retrieve a portion of the stored media content. Examples of the first communication network 108 include, but are not limited to, a wireless fidelity (Wi-Fi) network, a light fidelity (Li-Fi) network, a satellite network, an internet, a mobile network such as a cellular data network, a high speed packet access (HSPA) network, or any combination thereof In response to the received query, the database server 102 transmits the requested media content to the first device 110 via the first communication network 108. Examples of the database server 102 include, but are not limited to, a personal computer, a laptop, or a network of computer systems.

The commuter device 104 corresponds to a computing device that is utilized by a commuter to perform one or more activities. For example, the commuter utilizes the commuter device 104 to schedule a ride between a plurality of locations. To schedule the ride, the commuter inputs a first request, through a service application installed on the commuter device 104, to commute between the plurality of locations. The first request includes ride-related information, for example, a source location, a destination location, a waiting time, or other service-related details and preferences. The various modes of the input used by the commuter may include, but are not limited to, a touch-based input, a text-based input, a voice-based input, a gesture-based input, or a combination thereof. Based on a confirmation of the first request by the commuter, the commuter device 104 transmits the first request to the first device 110 via the first communication network 108. Examples of the commuter device 104 include, but are not limited to, a personal computer, a laptop, a smartphone, a tablet computer, and the like.

The vehicle 106 corresponds to a means of transport that is deployed by a vehicle service provider, such as a taxicab provider, to provide ride services to commuters. In an embodiment, the vehicle 106 is an automobile, a bus, a car, and the like. In another embodiment, the vehicle 106 is a train, an airplane, and the like. The commuters may travel in the vehicle 106 to commute from the source location to the destination location. Various methods of providing vehicle services to the commuters used by the vehicle service provider will be apparent to a person having skill in the relevant art. The vehicle 106 includes the first device 110 that receives the first request transmitted by the commuter device 104 via the first communication network 108. In one embodiment, the first device 110 is a vehicle head unit. In another embodiment, the first device 110 is an external communication device that is placed in the vehicle 106. In response to the received first request, the first device 110 extracts the media content including a first set of media content and a second set of media content from the database server 102 via the first communication network 108.

The vehicle 106 further includes the second device 112 that communicates with the first device 110 via the second communication network 114. Examples of the second device 112 include a smartphone, a personal digital assistant (PDA), a tablet, or any other portable communication device. The second communication network 114 establishes a communication channel between the first device 110 and the second device 112. Examples of the second communication network 114 include a Wi-Fi network, a Bluetooth low-energy (BLE) network, a Li-Fi, a fiber optic network, a coaxial cable network, an infrared network, a radio frequency (RF) network, or any combination thereof. Further, in response to a second request by the commuter to view the media content in the vehicle 106, the first device 110 displays the media content from one of the first set of media content or the second set of media content on a display screen (not shown) of the second device 112.

Figure 2:
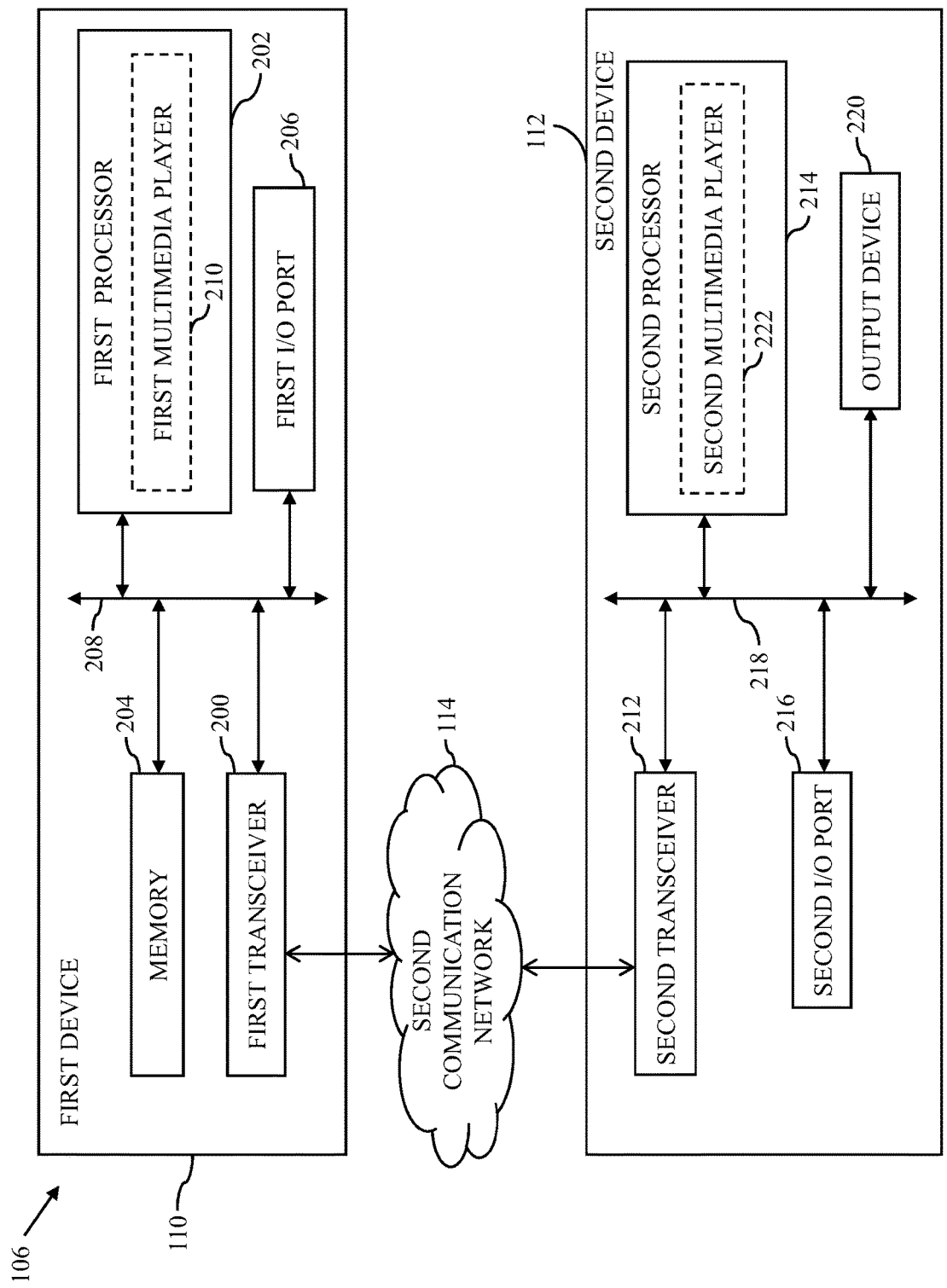
FIG. 2 is a block diagram that illustrates a first device and a second device of the system environment of FIG. 1 according to an embodiment of the present invention.

Referring now to FIG. 2, the first device 110 and the second device 112 of the system environment 100 in accordance with an embodiment of the present invention are shown. The first device 110 includes circuitry, such as a first transceiver 200, a first processor 202, a memory 204, and a first input/output (I/O) port 206. The first transceiver 200, the first processor 202, the memory 204, and the first I/O port 206 communicate with each other by way of a first bus 208. The second device 112 includes circuitry, such as a second transceiver 212, a second processor 214, a second I/O port 216, and an output device 220. The second transceiver 212, the second processor 214, the second I/O port 216, and the output device 220 communicate with each other by way of a second bus 218.

The first transceiver 200 includes suitable logic, circuitry, and/or interfaces to transmit or receive messages from various devices, such as the database server 102, the commuter device 104, and the second transceiver 212. The first transceiver 200 communicates with the database server 102 and the commuter device 104 via the first communication network 108. Further, the first transceiver 200 communicates with the second transceiver 212 via the second communication network 114. The first transceiver 200 receives the first request from the commuter device 104, and stores the received first request in the memory 204. The first transceiver 200 further receives the query from the first processor 202, and transmits the query to the database server 102 to extract the media content based on the received first request. In response to the transmitted query, the first transceiver 200 receives the media content extracted from the database server 102, and stores the extracted media content in the memory 204. The first transceiver 200 further receives the second request, from the second transceiver 212 or the commuter device 104, to play the media content. Examples of the first transceiver 200 include, but are not limited to, an antenna, a radio frequency transceiver, a wireless transceiver, a Bluetooth transceiver, and the like. The first transceiver 200 communicates with the database server 102, the commuter device 104, the first processor 202, and the second transceiver 212 by means of various wired and wireless communication protocols, such as TCP/IP, UDP, 2nd Generation (2G), 3rd Generation (3G), 4th Generation (4G) communication protocols, or any combination thereof.

The first processor 202 includes suitable logic, circuitry, and/or interfaces to execute instructions stored in the memory 204. For example, the first processor 202 analyzes the received first request. Further, in response to the analysis of the received first request, the first processor 202 generates the query to extract the media content from the database server 102. The first processor 202 receives and stores the extracted media content in the memory 204 by means of the first transceiver 200. The first processor 202 further receives the second request from the second processor 214 for the playback of the media content selected by the commuter in the vehicle 106. In response to the received second request, the first processor 202 transmits the media content to the second transceiver 212 using the first transceiver 200. The first processor 202 further controls the playback of the media content on the output device 220 of the second device 112 through the second I/O port 216. Examples of the first processor 202 include an application-specific integrated circuit (ASIC) processor, a reduced instruction set computing (RISC) processor, a complex instruction set computing (CISC) processor, a field-programmable gate array (FPGA), and the like. It will be apparent to a person skilled in the art that the first processor 202 is compatible with multiple multimedia players, for example, a first multimedia player 210. Examples of the first multimedia player 210 include Quicktime® player, Windows® Media Player, Video LAN client (VLC®) media player, RealPlayer®, iTunes®, and the like.

The memory 204 includes suitable logic, circuitry, and/or interfaces to store the media content. For example, the memory 204 is utilized for edge caching the media content extracted from the database server 102. The memory 204 further stores one or more requests received from the commuter device 104 or the second device 112. Examples of the memory 204 include, but are not limited to, a random access memory (RAM), a read-only memory (ROM), a programmable ROM (PROM), an erasable PROM (EPROM), and the like.

The first I/O port 206 includes suitable logic, circuitry, and/or interfaces that connect the first device 110 to various input and output devices, such as the output device 220 of the second device 112 in the vehicle 106. Examples of the first I/O port 206 include a universal serial bus (USB) port, an Ethernet port, and the like.

The second transceiver 212 includes suitable logic, circuitry, and/or interfaces to transmit or receive messages or media content from various devices, such as the first transceiver 200. The second transceiver 212 communicates with the first transceiver 200 via the second communication network 114. The second transceiver 212 transmits the second request provided by the commuter through the second I/O port 216 to the first transceiver 200. In response to the transmitted second request, the second transceiver 212 receives the media content from the first transceiver 200 under the control of the first processor 202. Examples of the second transceiver 212 include, but are not limited to, an antenna, a radio frequency transceiver, a wireless transceiver, a Bluetooth transceiver, and the like. The second transceiver 212 communicates with the first transceiver 200 and the second processor 214 using various wired and wireless communication protocols, such as TCP/IP, UDP, 2G, 3G, 4G communication protocols, or any combination thereof.

The second processor 214 includes suitable logic, circuitry, and/or interfaces to provide the playback of the media content requested by the commuter travelling in the vehicle 106. For example, the commuter selects the media content from a list of the stored media content in the memory 204. In response to the selection, the second processor 214 receives the selected media content from the first device 110, and plays the media content under the control of the first processor 202. Examples of the second processor 214 include an ASIC processor, a RISC processor, a CISC processor, an FPGA, and the like. It will be apparent to a person skilled in the art that the second processor 214 is compatible with multiple operating systems. The second processor 214 plays the media content on the output device 220 by means of a second multimedia player 222. Examples of the second multimedia player 222 include Quicktime® player, Windows® Media Player, Video LAN client (VLC®) media player, RealPlayer®, iTunes®, and the like.

The second I/O port 216 includes suitable logic, circuitry, and/or interfaces that connect the second device 112 to various input and output devices, such as the output device 220 in the vehicle 106. The second I/O port 216 enables the commuter in the vehicle 106 to provide an input, for example, the second request for the playback of various media content. The second I/O port 216 provides an output to the commuter by means of the output device 220 under the control of at least one of the first processor 202 and the second processor 214. The second I/O port 216 may include input devices, such as a touchscreen, a keyboard, a mouse, a joystick, a microphone, and the like. Further, the second I/O port 216 may include output devices, such as a speaker, a Liquid crystal display (LCD) screen, a Light emitting diode (LED) screen, headphones, and the like.

In operation, the commuter device 104 transmits the first request to the first device 110 via the first communication network 108. The first request corresponds to a request to commute between the plurality of locations including the source location and the destination location. The first transceiver 200 receives the first request, and stores the first request in the memory 204. The first processor 202 analyzes the received first request and determines whether a ride has been confirmed based on the received first request. Based on the confirmation of the ride, the first processor 202 generates the query to extract the media content including the first set of media content and the second set of media content from the database server 102. In an embodiment, the first processor 202 generates the query based on a set of rules. The first processor 202 determines the set of rules based on a fixed type and a dynamic type of the media content. The fixed type of the media content corresponds to the first set of media content that need to be essentially stored in the memory 204.

The fixed media content (i.e., the first set of media content) includes the media content, such as, but is not limited to, safety-related media content or trending media content. For example, the fixed media content may include an audio file or a video file of safety-related procedures to be followed by the commuter while riding the vehicle 106. The fixed media content further includes popular media content associated with at least one of music, movies, sports, and newscast of the one or more events that are trending in one or more geographical regions including a current geographical region of the commuter.

The dynamic media content (i.e., the second set of media content) includes the media content that is dynamic in nature i.e., the dynamic media content changes with respect to time based on the commuter. The dynamic media content is determined based on regional preferences, personal preferences, or watch history of the commuter. For example, the dynamic media content may include an audio file or a video file related to music, movies, sports, or newscast of the one or more events that are specific to a region as preferred by the commuter. The dynamic media content may include the audio file or the video file that are related to (or similar to) the media content that has been recently viewed, visited, or liked by the commuter. The first processor 202 determines such preferences of the commuter based on a browsing history, travel history, or social media profile of the commuter. Based on the generation of the query to extract the media content from the database server 102, the first transceiver 200 transmits the generated query to the database server 102 via the first communication network under the control of the first processor 202. In response to the received query from the first transceiver 200, the database server 102 transmits the media content. The first transceiver 200 receives the extracted media content including the first set of media content and the second set of media content, and stores the extracted media content in the memory 204.

In another embodiment, the first processor 202 extracts the media content including the first set of media content and the second set of media content from the database server 102 based on a segmentation of the media content. The first processor 202 segments the first set of media content and the second set of media content into a first set of multiple media content and a second set of multiple media content based on at least one of the watch history of the commuter or the (expected) journey time between the plurality of locations. Based on the segmentation, the first processor 202 retrieves only those segmented parts of the media content that are relevant to the commuter during the ride. For example, based on the watch history of the commuter, the first processor 202 determines that the commuter had watched first "10 minutes" of a short movie "ABCDEF" having a movie duration of "25 minutes" in total. In such a scenario, the first processor 202 may segment the short movie "ABCDEF" into two parts, such as a first part of the short movie "ABCDEF" with "10 minutes" duration that has been already watched by the commuter, and a second part of the short movie "ABCDEF" with "15 minutes" duration that has not been watched by the commuter. After the segmentation, the first processor 202 may extract the second part of the movie "ABCDEF" with "15 minutes" duration, and stores the extracted second part of the movie "ABCDEF" in the memory 204.

In another example, the first processor 202 segments the media content based on the journey time between the plurality of locations including the source location and the destination location. For example, based on the received first request, the first processor 202 determines that the expected journey time between the plurality of locations including the source location and the destination location is "10 minutes". In such a scenario, the first processor 202 segments a video into two parts, and thereafter, extracts and stores the part of the video with "10 minutes" duration.

In yet another example, the first processor 202 segments the media content based on the watch history of the commuter and the expected journey time between the plurality of locations including the source location and the destination location. Considering the ongoing examples as described above, the first processor 202 determines that the commuter had watched first "10 minutes" of the short movie "ABCDEF" having the movie duration of "25 minutes" in total. The first processor 202 further determines that the journey time is "10 minutes". In such a scenario, the first processor 202 may segment the short movie "ABCDEF" into three parts, such as a first part of the short movie "ABCDEF" with "10 minutes" duration that has been already watched by the commuter, a second part of the short movie "ABCDEF" with "10 minutes" duration that has not been watched by the commuter, and a third part of the short movie "ABCDEF" with "5 minutes" duration that has not been watched by the commuter. After the segmentation, the first processor 202 may extract the second part of the movie "ABCDEF" with "10 minutes" duration that matches with the determined journey time "10 minutes", and stores the extracted second part of the movie "ABCDEF" in the memory 204.

In another embodiment, the first processor 202 extracts the media content including the first set of media content and the second set of media content from the database server 102 in a time duration that is based on a first time and a second time. The first time corresponds to a time of confirmation of the received first request by the commuter. The second time corresponds to a time of boarding of the vehicle 106 by the commuter. Therefore, the first processor 202 extracts the media content including the first set of media content and the second set of media content from the database server 102 in the time duration defined by the first time and the second time. For example, the first processor 202 extracts the media content based on at least one of the generated set of rules and the segmentation of the media content, as described above, before the boarding of the vehicle 106 by the commuter. Thereafter, the first transceiver 200 stores the extracted media content including the first set of media content and the second set of media content into the memory 204 under the control of the first processor 202.

After the commuter has boarded the vehicle 106, the commuter provides, by means of the second I/O port 216, the second request to play the media content selected from one of the stored first set of media content or the stored second set of media content. The second transceiver 212 transmits the second request to the first transceiver 200. Based on the received second request, the first processor 202 may retrieve the selected media content from the memory 204. The first processor 202 further controls the playback of the retrieved media content on the output device 220 of the second device 112 based on the received second request.

Further, in an embodiment, the first processor 202 updates the stored second set of media content in the memory 204. The first processor 202 updates the stored second set of media content based on a real time or a near-real time extraction of the dynamic type of the media content from the database server 102. The first processor 202 executes the real time or near-real time extraction of the dynamic type of the media content from the database server 102 in response to a third request by the commuter in the vehicle 106. The commuter provides, by means of the second I/O port 216, the third request including his/her preferences for the dynamic type of the media content. In response to the third request, the first processor 202 executes the real time (or near-real time) extraction of the dynamic type of the media content from the database server 102. The dynamic type of the media content is extracted from the database server 102 based on a remaining journey time associated with the received first request.

Thus, the system environment 100 provides a mechanism for edge caching the media content in the memory 204 of the first device 110 placed in the vehicle 106. The system environment 100 uses a set of request commands exchanged between the first device 110 and the commuter device 104 or the second device 112 for edge caching the media content. Based on such targeted edge caching of the media content in the memory 204 of the first device 110, the memory requirement for the storage of the targeted media content is less, and thus, additional memory requirement for the storage is minimized. Further, the system environment 100 for edge caching the media content on the first device 110 of the vehicle 106 discourages the commuters from carrying any additional hardware devices including the media content of their interests which, sometimes, may cause inconvenience to the commuters. Thus, the system environment 100 does not require the additional hardware devices for playing the media content. Further, the system environment 100 offers another advantage where the commuters travelling in the vehicle 106 has total control over the playback of the media content. With such control, the commuters can provide the request commands to extract the desired media content in the real time or near-real time. Further, the first device 110 is capable of pairing with commuter's personal device, such as the commuter device 104, and thus, the commuter can control the playback of the media content by using his/her personal device.

Figure 3A:
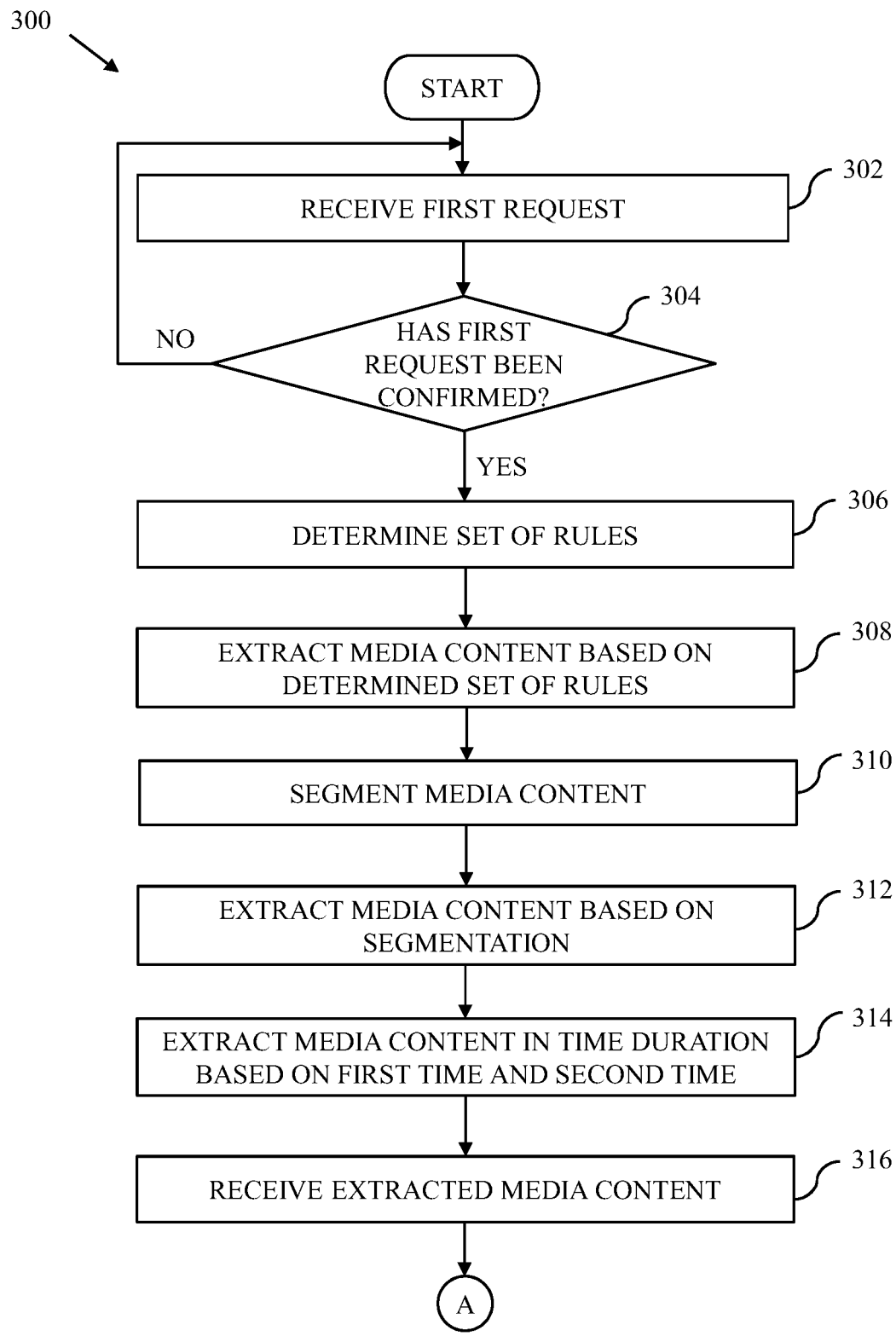
FIGS. 3A and 3B, collectively, illustrate a flow chart of a method for edge caching the media content on the first device of a vehicle of the system environment of FIG. 1 according to an embodiment of the present invention.
Figure 3B:
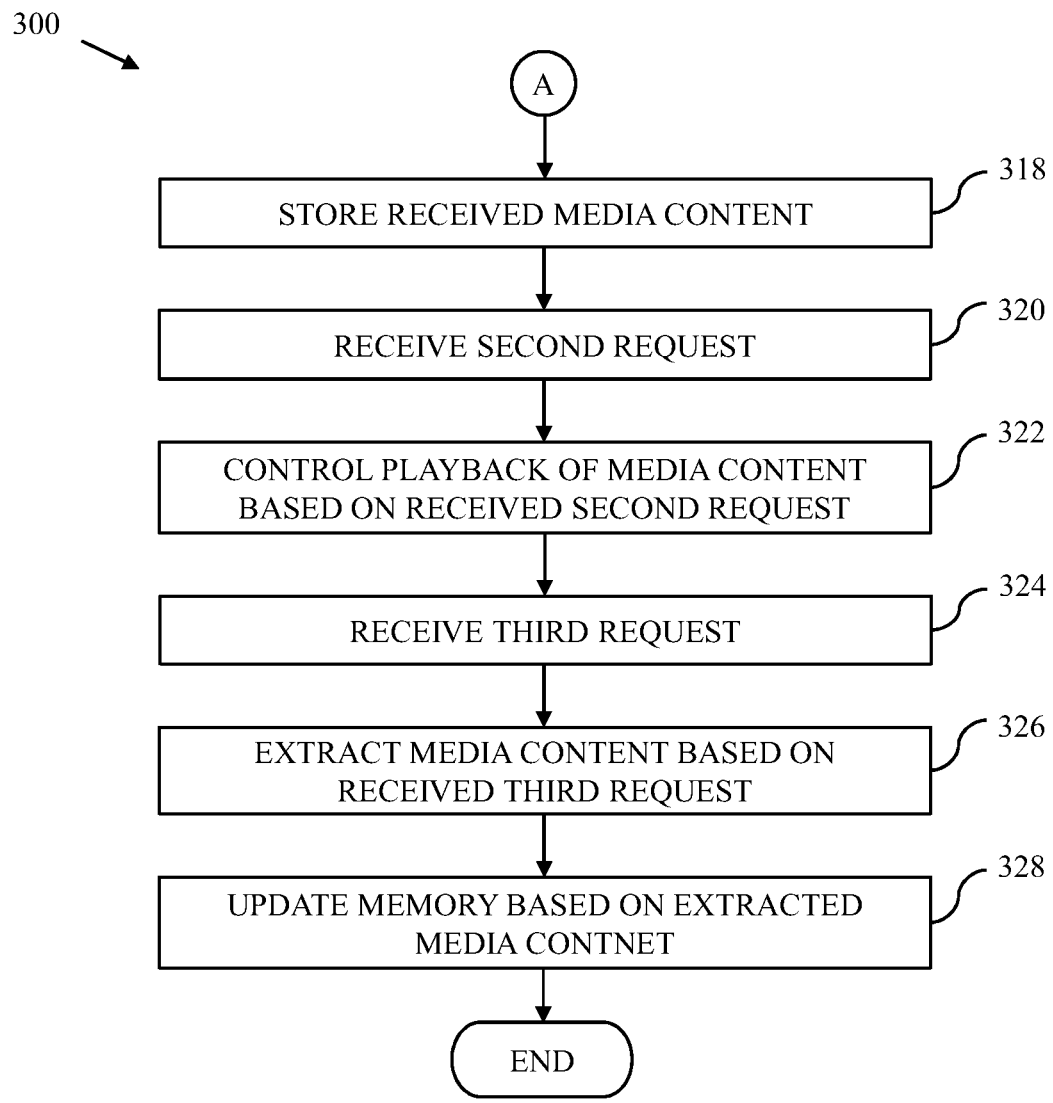

Referring now to FIGS. 3A and 3B, a flowchart 300 that illustrates a method for edge caching the media content on the first device 110 of the vehicle 106 of the system environment 100 in accordance with an embodiment of the present invention is shown.

At step 302, the first processor 202 receives the first request from the commuter device 104 via the first transceiver 200. The first request corresponds to a request to commute between the plurality of locations including the source location and the destination location. The commuter device 104 transmits the first request to the first transceiver 200 via the first communication network 108.

At step 304, the first processor 202 determines whether the first request has been confirmed. Alternatively stated, the first processor 202 determines whether the commuter has confirmed the first request for the vehicle 106 for a ride between the plurality of locations. If at step 304, it is determined that the first request has not been confirmed, the first processor 202 may receive the first request from another commuter device. However, if at step 304, it is determined that the first request has been confirmed, step 306 is executed.

At step 306, the first processor 202 determines the set of rules. In response to the confirmation of the received first request, the first processor 202 determines the set of rules based on the fixed type and the dynamic type of the media content. In an embodiment, the fixed type of the media content corresponds to the first set of media content including fixed media content. The first processor 202 determines the set of rules corresponding to the first set of media content based on at least one of the safety-related media content and the trending media content that need to be essentially stored in the memory 204. In an embodiment, the dynamic type of the media content corresponds to the second set of media content. The first processor 202 determines the set of rules corresponding to the dynamic type of media content based on at least one of the regional preferences, the commuter preferences, and the watch history of the commuter.

At step 308, the first processor 202 extracts the media content including the first set of media content and the second set of media content from the database server 102 based on the determined set of rules. The first processor 202 generates the query to extract the media content based on the determined set of rules. Thereafter, the first processor 202 transmits the generated query to the database server 102 by means of the first transceiver 200 to extract the media content including the first set of media content and the second set of media content.

At step 310, the first processor 202 segments the media content including the first set of media content and the second set of media content. The first processor 202 segments the media content of the first set of media content and the second set of media content into the first set of multiple media content and the second set of multiple media content based on at least one of the watch history of the commuter and the journey time between the plurality of locations. At step 312, the first processor 202 extracts the first set of media content and the second set of media content from the database server 102 based on the segmentation of the media content. Based on the segmentation, the first processor 202 extracts the first set of media content and the second set of media content that are more relevant to the commuter with respect to the received first request provided by the commuter.

At step 314, the first processor 202 extracts the media content including the first set of media content and the second set of media content from the database server 102 in the time duration that is based on the first time and the second time. The first time corresponds to a time of confirmation of the received first request. The second time corresponds to a time of boarding of the vehicle 106 by the commuter based on the received first request. Thus, the first processor 202 extracts the first set of media content and the second set of media content from the database server 102 after the confirmation of the received first request and before the boarding of the vehicle 106 by the commuter.

At step 316, the first processor 202 receives the extracted media content including the first set of media content and the second set of media content from the database server 102 by means of the first transceiver 200. At step 318, the first processor 202 stores the received media content including the first set of media content and the second set of media content in the memory 204.

At step 320, the first processor 202 receives the second request from the second processor 214. After the boarding of the vehicle 106 by the commuter, the commuter provides the second request by means of the second I/O port 216. The second request may correspond to a request to play the media content selected by the commuter in the vehicle 106. At step, 322, the first processor 202 controls the playback of the selected media content from one of the stored first set of media content or the stored second set of media content. The first processor 202 controls the playback of the selected media content on the output device 220 of the second device 112 based on the received second request.

At step 324, the first processor 202 receives the third request from the second processor 214. The third request corresponds to a request to extract on-demand media content in the real time or the near-real time. At step 326, the first processor 202 executes the real-time (or near-real time) extraction of the on-demand media content from the database server 102 based on the received third request. At step 328, the first processor 202 updates the memory 204 based on the real-time (or near-real time) extraction of the on-demand media content. Further, the first processor 202 controls the playback of the extracted on-demand media content on the output device 220 of the second device 112.

Figure 4:
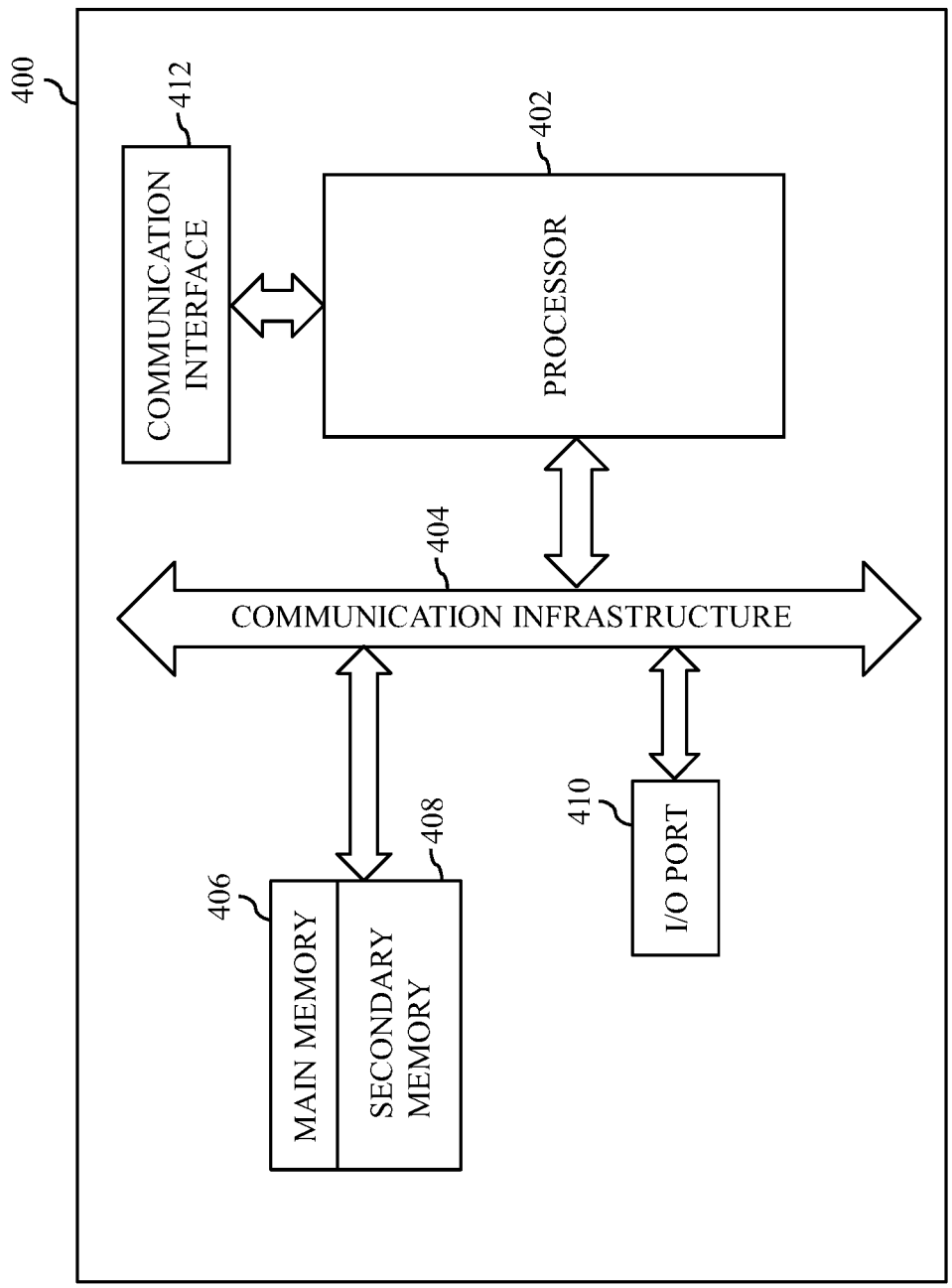
FIG. 4 illustrates a block diagram of a computer system for edge caching the media content on the first device of the vehicle in the system environment of FIG. 1 according to an embodiment of the present invention.

Referring now to FIG. 4, a block diagram of a computer system 400 for edge caching the media content on the first device 110 of the vehicle 106 in the system environment 100 according to an embodiment of the present invention is shown. An embodiment of present invention, or portions thereof, may be implemented as computer readable code on the computer system 400. In one example, the database server 102, the first device 110, and the second device 112 of FIG. 1 may be implemented in the computer system 400 using hardware, software, firmware, non-transitory computer readable media having instructions stored thereon, or a combination thereof and may be implemented in one or more computer systems or other processing systems. Hardware, software, or any combination thereof may embody modules and components used to implement the method of FIGS. 3A and 3B.

The computer system 400 includes a processor 402 that may be a special purpose or a general purpose processing device. The processor 402 may be a single processor, multiple processors, or combinations thereof. The processor 402 may have one or more processor "cores." Further, the processor 402 may be connected to a communication infrastructure 404, such as a bus, a bridge, a message queue, the second communication network 114, multi-core message-passing scheme, and the like. The computer system 400 further includes a main memory 406 and a secondary memory 408. Examples of the main memory 406 may include random access memory (RAM), read-only memory (ROM), and the like. The secondary memory 408 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 400 further includes an input/output (I/O) port 410 and a communication interface 412. The I/O port 410 includes various input and output devices that are configured to communicate with the processor 402. Examples of the input devices may include a keyboard, a mouse, a joystick, a touchscreen, a microphone, and the like. Examples of the output devices may include a display screen, a speaker, headphones, and the like. The communication interface 412 may be configured to allow data to be transferred between the computer system 400 and various devices that are communicatively coupled to the computer system 400. Examples of the communication interface 412 may include a modem, a network interface, i.e., an Ethernet card, a communications port, and the like. Data transferred via the communication interface 412 may correspond to signals, such as electronic, electromagnetic, optical, or other signals as will be apparent to a person skilled in the art. The signals may travel via a communications channel, such as the first communication network 108 or the second communication network 114, which may be configured to transmit the signals to devices that are communicatively coupled to the computer system 400. Examples of the communication channel may include, but are not limited to, cable, fiber optics, a phone line, a cellular phone link, a radio frequency link, a wireless link, and the like.

Computer program medium and computer usable medium may refer to memories, such as the main memory 406 and the secondary memory 408, which may be a semiconductor memory such as dynamic RAMs. These computer program mediums may provide data that enables the computer system 400 to implement the method illustrated in FIGS. 3A and 3B. In an embodiment, the present invention is implemented using a computer implemented application, such as the first multimedia player 210 and the second multimedia player 222. The computer implemented application may be stored in a computer program product and loaded into the computer system 400 using the removable storage drive or the hard disc drive in the secondary memory 408, the I/O port 410, or the communication interface 412.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 402 and a memory such as the main memory 406 and the secondary memory 408 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present invention provide, among other features, systems and methods for edge caching media content. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A system, comprising:
 a first device in a vehicle, the first device comprising:
  a memory configured to store media content; and
  circuitry configured to:
   receive, from a commuter device of a commuter via a first communication network, a first request for a ride between a plurality of locations that includes a source location and a destination location;
   extract, from a database server via the first communication network, based on confirmation of the ride and before the vehicle is boarded by the commuter for the ride between the plurality of locations, the media content that includes a first set of media content and a second set of media content based on a journey time between the plurality of locations and a set of rules,
   wherein the set of rules is determined based on a fixed type and a dynamic type of the media content,
   wherein the first set of media content and the second set of media content are extracted from the database server based on segmentation of each media content,
   wherein each media content for the first set of media content and each media content for the second set of media content are segmented into a first plurality of parts and a second plurality of parts, respectively, based on commuter watch history of the commuter and the journey time of the ride between the plurality of locations, and wherein, for each media content in the first set of media content and for each media content in the second set of media content, at least a first part and a second part, each part with a time duration that matches with the journey time, are extracted from the first plurality of parts and the second plurality of parts, respectively, before the vehicle is boarded by the commuter for the ride between the plurality of locations;

store the extracted media content in the memory, wherein the extracted media content includes the first set of media content with the first part of each media content and the second set of media content with the second part of each media content; and control a playback of the media content, from one of the first set of media content and the second set of media content, on an output device of a second device in the vehicle based on a second request by the commuter in the vehicle, wherein the second request is provided by the commuter to view the media content in the vehicle while in the ride between the plurality of locations, and wherein the second device communicates with the first device over a second communication network that is different from the first communication network.

2. The system according to claim 1, wherein the fixed type of the media content corresponds to the first set of media content that includes fixed media content stored in the memory.

3. The system according to claim 2, wherein the circuitry is further configured to determine the fixed media content based on at least safety-related media content and trending media content associated with at least one of music, movies, sports, and newscast of one or more events in one or more regions.

4. The system according to claim 2, wherein the dynamic type of the media content corresponds to the second set of media content that includes dynamic media content, wherein the dynamic media content is determined based on at least one of regional preferences, commuter preferences, and watch history of the commuter.

5. The system according to claim 1, wherein the circuitry is further configured to extract the first set of media content and the second set of media content from the database server based on the set of rules in a time duration that is associated with a first time and a second time, wherein the first time is determined based on a time of confirmation of the received first request by the commuter, and wherein the second time is determined based on a time at which the vehicle is boarded by the commuter for the ride between the plurality of locations.

6. The system according to claim 1, wherein the circuitry is further configured to update the stored second set of media content in the memory based on real time extraction of a dynamic type of the media content, wherein the dynamic type of the media content is extracted in real time based on a third request by the commuter in the vehicle, and wherein the third request is provided by the commuter to view preferred media content other than the first and the second sets of media content in the vehicle while in the ride between the plurality of locations.

7. The system according to claim 6, wherein the real time extraction of the dynamic type of the media content that includes the preferred media content is performed based on a remaining journey time associated with the ride.

8. The system according to claim 1, wherein the journey time is determined based on the first request that includes the source location and the destination location.

9. A method comprising:

receiving, by a first device in a vehicle from a commuter device of a commuter via a first communication network, a first request for a ride between a plurality of locations including a source location and a destination location;

extracting, by the first device from a database server via the first communication network, based on confirmation of the ride and before boarding of the vehicle by the commuter for the ride, the media content including a first set of media content and a second set of media content based on a journey time between the plurality of locations and a set of rules, wherein the set of rules is determined based on a fixed type and a dynamic type of the media content, wherein the first set of media content and the second set of media content are extracted from the database server based on segmentation of each media content, wherein each media content for the first set of media content and each media content for the second set of media content are segmented into a first plurality of parts and a second plurality of parts, respectively, based on commuter watch history of the commuter and the journey time of the ride between the plurality of locations, and wherein, for each media content in the first set of media content and for each media content in the second set of media content, at least a first part and a second part, each part having a time duration that matches with the journey time, are extracted from the first plurality of parts and the second plurality of parts, respectively, before the vehicle is boarded by the commuter for the ride between the plurality of locations;

storing, by the first device, the extracted media content in a memory of the first device, wherein the extracted media content includes the first set of media content with the first part of each media content and the second set of media content with the second part of each media content; and controlling, by the first device, a playback of the media content, from one of the first set of media content and the second set of media content, on an output device of a second device in the vehicle based on a second request by the commuter in the vehicle, wherein the second request is provided by the commuter to view the media content in the vehicle during the ride between the plurality of locations, and wherein the second device communicates with the first device over a second communication network that is different from the first communication network.

10. The method according to claim 9, wherein the fixed type of the media content corresponds to the first set of media content including fixed media content stored in the memory.

11. The method according to claim 10, further comprising determining, by the first device, the fixed media content based on at least safety-related media content and trending media content associated with at least one of music, movies, sports, and newscast of one or more events in one or more regions.

12. The method according to claim 10, wherein the dynamic type of the media content corresponds to the second set of media content including dynamic media content that is determined based on at least one of regional preferences, commuter preferences, and watch history of the commuter.

13. The method according to claim 9, further comprising extracting, by the first device from the database server, the first set of media content and the second set of media content in a time duration that is based on a first time and a second time,
    wherein the first time is determined based on a time of confirmation of the received first request by the commuter, and
    wherein the second time is determined based on a time of boarding of the vehicle by the commuter for the ride between the plurality of locations.

14. The method according to claim 9, further comprising updating, by the circuitry, the stored second set of media content in the memory based on real time extraction of a dynamic type of the media content, wherein the dynamic type of the media content is extracted in real time based on a third request by the commuter in the vehicle, and wherein the third request is provided by the commuter to view preferred media content other than the first and the second sets of media content in the vehicle during the ride between the plurality of locations.

15. The method according to claim 14, wherein the real time extraction of the dynamic type of the media content including the preferred media content is performed based on a remaining journey time associated with the ride.

16. The method according to claim 9, wherein the journey time is determined based on the first request including the source location and the destination location.

17. A system, comprising:
    a first device in a vehicle, the first device comprising:
        a memory configured to store media content; and
        circuitry configured to:
            receive, from a commuter device of a commuter via a first communication network, a first request for a ride between a plurality of locations that includes a source location and a destination location;
            extract, from a database server via the first communication network, based on confirmation of the ride and before the vehicle is boarded by the commuter for the ride, the media content based on at least a journey time of the ride between the plurality of locations,
                wherein the media content that includes a first set of media content and a second set of media content are extracted from the database server based on segmentation of each media content,
                wherein each media content for the first set of media content and each media content for the second set of media content are segmented into a first plurality of parts and a second plurality of parts, respectively, based on commuter watch history of the commuter and the journey time, and
                wherein, for each media content in the first set of media content and for each media content in the second set of media content, at least a first part and a second part, each part with a time duration that matches with the journey time, are extracted from the first plurality of parts and the second plurality of parts, respectively, before the vehicle is boarded by the commuter for the ride;
            store the extracted media content in the memory; and
            control a playback of the stored media content, from one of the first set of media content and the second set of media content, on an output device of a second device in the vehicle based on a second request provided by the commuter to view the media content in the vehicle.

* * * * *